United States Patent
Horii et al.

[11] Patent Number: 5,916,682
[45] Date of Patent: Jun. 29, 1999

[54] CARBON FIBER REINFORCED COMPOSITE MATERIAL

[75] Inventors: Hideyuki Horii; Takayuki Matsumoto; Shinichi Takemura, all of Yokohama, Japan

[73] Assignee: Nippon Oil Co., Ltd., Tokyo, Japan

[21] Appl. No.: 08/949,780

[22] Filed: Oct. 14, 1997

[30] Foreign Application Priority Data

Oct. 14, 1996 [JP] Japan .................................. 8-289000

[51] Int. Cl.$^6$ ........................................................ B32B 9/00
[52] U.S. Cl. ........................................... 428/408; 428/408
[58] Field of Search ................................ 428/221, 296.7, 428/297.4, 298.1, 299.1, 300.4, 300.7, 408

[56] References Cited

PUBLICATIONS

Jang, Anvanced Polymer Composites. pp. 9–12, c. 1995.

*Primary Examiner*—Rich Weisberger
*Attorney, Agent, or Firm*—Kubovcik & Kubovcik

[57] ABSTRACT

A carbon fiber-reinforced composite material comprising a laminate of a plurality of prepreg sheets each comprising polyacrylonitrile-based carbon fibers having a tensile modulus of 100 to 600 GPa, characterized in that at least one of the prepreg sheets is a replaced prepreg sheet with one-tenth to one-half area of the sheet replaced by a prepreg comprising only pitch-based carbon fibers having a tensile modulus of 400 to 1000 GPa.

1 Claim, 1 Drawing Sheet

Fig. 1 (1)
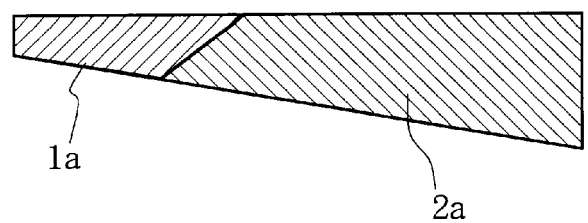
Fig. 1 (2)
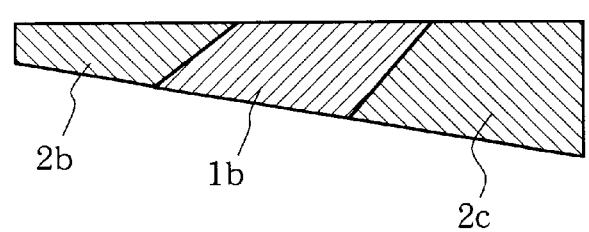
Fig. 1 (3)
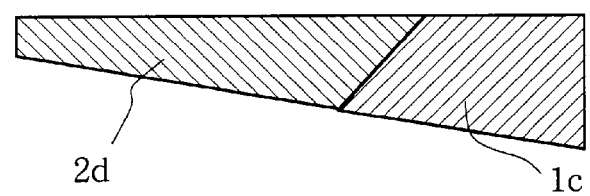
Fig. 2
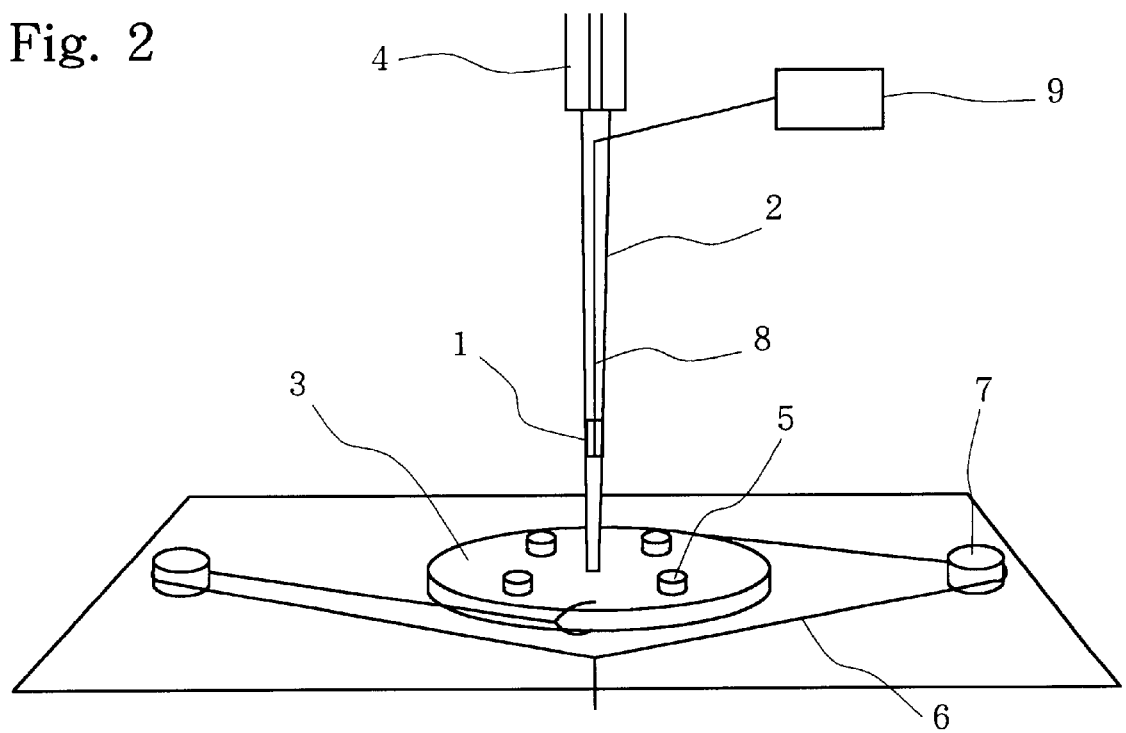

CARBON FIBER REINFORCED COMPOSITE MATERIAL

DETAILED DESCRIPTION OF THE INVENTION

1. Technical Field to Which the Invention Belongs

This invention relates to a carbon fiber-reinforced composite material. In particular, this invention relates to a carbon fiber-reinforced composite material having an excellent vibration damping property and suitable for use in golf club shafts, fishing rods, robot arms and the like.

2. Prior Art

The fields of sporting goods such as golf shafts and fishing rods aim at improvements in their performance such as light weight, high strength, and high freedom in rigidity design, and fiber-reinforced composite materials such as carbon fiber-reinforced composite materials have come to be extensively used.

One element of the high performance is a high vibration damping property, which is required of golf shafts, fishing rods, aerospace structures, automatic assembly machine parts and the like. For example, a golf shaft having a high vibration damping property is less likely to numb the hands in hitting the ball.

The modification in the matrix resin and provision of an interleaf layer have hitherto been conducted for enhancing the vibration damping property. These means, however, have raised problems such that the moisture absorption resistance is lowered, the molding method should be changed, and the interlaminar strength is lowered.

Further, there is a means using a combination of carbon fibers based on polyacrylonitrile (hereinafter referred to as "PAN") with aramid fibers having an excellent vibration damping property. This method is, however, unsuitable for applications wherein the moisture absorption resistance is required.

Problems to be Solved by the Invention

An object of this invention is to solve those problems of the prior art to thereby provide a carbon fiber-reinforced composite material having an excellent vibration damping property.

Means to Solve the Problems

This invention relates to a carbon fiber-reinforced composite material comprising a laminate of a plurality of prepreg sheets each comprising polyacrylonitrile-based carbon fibers having a tensile modulus of 100 to 600 GPa, characterized in that at least one of the prepreg sheets is a replaced prepreg sheet wherein one-tenth to one-half part (in terms of area ratio) thereof is replaced with a prepreg comprising only pitch-based carbon fibers having a tensile modulus of 400 to 1000 GPa.

Modes for Carrying Out the Invention

The carbon fiber-reinforced composite according to this invention refers to any molding made from a carbon fiber-reinforced composite material and includes oblong moldings such as sheets or plates as well as cylindrical moldings.

In this invention, the oblong moldings such as sheets or plates refer to those which have a length to width ratio of usually from 2 to 500, and include not only flat platy moldings but also platy moldings having surface irregularities and moldings having an I-, T-, L- or other shaped section.

In this invention, the cylindrical molding may be not only a hollow body consisting of a side wall alone such as a tubular molding, but also a hollow molding which is essentially closed all around, and specific examples thereof are truly cylindrical moldings, hollow triangular prismatic moldings, hollow hexagonal prismatic moldings, and tapered cylindrical moldings such as fishing rods, golf shafts and robot arms. The composite material of this invention is preferably used particularly in tapered shafts such as golf shafts.

The carbon fiber-reinforced composite material according to this invention may generally contain 1 to 20 layers of carbon fiber prepreg sheet (hereinafter referred to as "replaced prepreg sheet") which is prepared by replacing one-tenth to one-half part (in terms of sheet area ratio), preferably two-tenth to four-tenth parts of a prepreg sheet comprising polyacrylonitrile-based carbon fibers having a tensile modulus of 100 to 600 GPa with a prepreg comprising only pitch-based carbon fibers having a tensile modulus of 400 to 1000 GPa.

The pitch-based carbon fibers used in this invention are superior in vibration damping property to PAN-based carbon fibers having the same tensile modulus as the pitch-based fibers have, and such pitch-based carbon fibers have a tensile modulus of usually 400 to 1000 GPa, preferably 600 to 1000 GPa.

The pitch-based carbon fiber prepreg preferably develops, when molded, a larger vibration damping factor. Specifically, the preferred prepreg comprises pitch-based carbon fibers having such a property that when a bending strain of 100 $\mu\epsilon$ is applied to a unidirectional cantilever of a carbon fiber-reinforced plastic comprising only said pitch-based carbon fibers in a fiber volume fraction of 60 vol %, the cantilever should exhibit a vibration damping factor of usually 0.01 to 0.05, preferably 0.02 to 0.05. More specifically, a pitch-based carbon fiber having a tensile modulus of 400 to 1000 GPa has such a property.

Although the prepreg sheet used in this invention may be a woven prepreg or a unidirectional prepreg, the unidirectional prepreg is preferred because the angle of orientation of the fibers can be easily regulated.

In the preparation of an oblong molding, the prepreg comprising only pitch-based carbon fibers having a tensile modulus of 400 to 1000 GPa, preferably 600 to 1000 GPa, may be used in the uppermost layer and/or the lowermost layer of a thin portion of the resulting molding, said thin portion having a thickness of not larger than the average thickness of the molding, preferably a thickness of not more than 90% of the average thickness, still preferably a thickness of not more than 80% of the average thickness, that is, used in a portion where a larger strain is created.

In the preparation of a cylindrical molding, the prepreg comprising only pitch-based carbon fibers having a tensile modulus of 400 to 1000 GPa, preferably 600 to 1000 GPa, is desirably used in a thin laminate portion of the resulting molding, said portion having a thickness of not larger than the average diameter of the molding, preferably a thickness of not more than 90% of the average diameter, still preferably a thickness of not more than 80% of the average diameter, that is, in a portion where a larger strain is created. Such a portion is, for example, the base portion of a club head of a golf shaft, the front end of a fishing rod, or the fixing end of a cantilever.

The proportion of the pitch-based carbon fiber prepreg which occupies the above particular portion, such as the small-thickness portion or small-diameter portion of the molding, is usually from one-twentieth to one-half, preferably from one-tenth to four-tenths in terms of the volume ratio of the molding.

The replaced prepreg sheet is prepared by cutting a particular portion off the prepreg sheet comprising PAN-based carbon fibers and replacing the cut-off portion with the prepreg comprising only pitch-based carbon fibers.

In this connection, the angle of orientation of the pitch-based carbon fibers constituting the replacing prepreg to the orientation of the PAN-based carbon fibers constituting the prepreg remaining uncut is preferably −5° to 5°, still preferably −3° to 3°.

It is preferable that at the boundary between the prepreg comprising PAN-based carbon fibers and the prepreg comprising only pitch-based carbon fibers both constituting the replaced prepreg sheet, these two prepregs be arranged so as not to substantially overlap with each other and, at the same time, not to create a gap therebetween.

In the carbon fiber prepreg sheet used in this invention, a prepreg mainly comprising PAN-based carbon fibers having a tensile modulus of 100 to 600 GPa, preferably 200 to 300 GPa, is usually used in the portion of the sheet other than the portion using the prepreg comprising only pitch-based carbon fibers having a tensile modulus of 400 to 1000 GPa.

The PAN-based carbon fibers usable herein are ones which have a compressive strength of usually 500 to 2500 MPa, preferably 700 to 2500 MPa, still preferably 1000 to 2500 MPa.

In this invention, the prepreg comprising only pitch-based carbon fibers having a tensile modulus of 400 to 1000 GPa, preferably 600 to 1000 GPa, is usable as a part of the substantially uppermost layer, lowermost layer, innermost layer, outermost layer or the like of the molding.

In the preparation of a cylindrical molding, first a prepreg sheet comprising PAN-based carbon fibers having a tensile modulus of 100 to 600 GPa is wound in usually 1 to 20 layers around a mandrel, and then a replaced prepreg sheet is wound in usually 1 to 20 layers therearound in such a manner that as shown in FIG. 1 (1), the prepreg (1a) of the replaced sheet, comprising pitch-based carbon fibers having a tensile modulus of 400 to 1000 GPa, is located at a portion ranging from one end to a particular site of the desired molding and that the prepreg (2a) of the replaced sheet, mainly comprising PAN-based carbon fibers having a tensile modulus of 100 to 600 GPa, is located in the remaining portion of the molding.

Alternatively, as shown in FIG. 1 (1), a replaced prepreg sheet may be wound in usually 1 to 20 layers around a mandrel in such a manner that the pitch-based carbon fiber prepreg (1a) of the replaced sheet is located at a portion ranging from one end to a particular site of the desired cylindrical molding and that the prepreg (2a) of the replaced sheet, mainly comprising PAN-based carbon fibers having a tensile modulus of 100 to 600 GPa, is located in the remaining portion of the molding, followed by the winding therearound of a prepreg sheet mainly comprising PAN-based carbon fibers having a tensile modulus of 100 to 600 GPa in usually 1 to 20 layers.

In this invention, the reinforcing fibers constituting a molding may be oriented unidirectionally or in two or more different directions.

The molding of this invention may be usually composed of an angle layer and a straight layer. For example, the cylindrical molding may be composed of an angle layer with its reinforcing fibers inclined at an angle to the axial direction of the molding and a straight layer with its reinforcing fibers oriented substantially in the axial direction of the molding. The oblong molding such as a sheet or plate may be composed of a straight layer with its reinforcing fibers oriented substantially in the longitudinal direction of the molding and an angle layer with its reinforcing fibers oriented at an angle to the longitudinal direction of the molding.

More specifically, the angle layer includes positive and negative angle layers. The positive angle layer is laminated or wound around a mandrel so that its reinforcing fibers are oriented at an angle of 30° to 60°, preferably 35° to 55°, still preferably 40° to 50°, to the longitudinal direction of the resulting oblong molding such as a sheet or plate or to the axial direction of the resulting cylindrical molding.

The negative angle layer is oriented so that its reinforcing fibers cross those of the positive angle layer. The negative angle layer is laminated or wound around a mandrel so that its reinforcing fibers are oriented at an angle of −30° to −60°, preferably −35° to −55°, still preferably −40° to −50°, to the longitudinal direction of the resulting oblong molding such as a sheet or plate or to the axial direction of the resulting cylindrical molding.

The straight layer is laminated or wound around a mandrel so that its reinforcing fibers are oriented at an angle of −20° to 20°, preferably −10° to 10°, to the longitudinal direction of the resulting oblong molding such as a sheet or plate or to the axial direction of the resulting cylindrical molding.

Either of the angle and straight layers may be first laminated around the mandrel or the like.

In the preparation of a tapered cylindrical molding, a replaced prepreg sheet may be used as the angle layer in such a manner that its prepreg comprising pitch-based carbon fibers having a tensile modulus of 400 to 1000 GPa is located in a portion ranging from the small-diameter end of the resulting molding to a site thereof having a relatively large diameter and its prepreg mainly comprising PAN-based carbon fibers having a tensile modulus of 100 to 600 GPa is located in the remaining portion of the molding, while used as the straight layer may be a prepreg sheet mainly comprising PAN-based carbon fibers having a tensile strength of 100 to 600 GPa.

In the preparation of the tapered cylindrical molding, alternatively, the replaced prepreg sheet may be used as the straight layer in such a manner that its prepreg comprising pitch-based carbon fibers having a tensile modulus of 400 to 1000 GPa is located in a portion ranging from the small-diameter end of the resulting molding to a site thereof having a relatively large diameter and its prepreg mainly comprising PAN-based carbon fibers having a tensile modulus of 100 to 600 GPa is located in the remaining portion of the molding, while used as the angle layer may be the prepreg sheet mainly comprising PAN-based carbon fibers having a tensile strength of 100 to 600 GPa.

Specifically, for the products which are likely to undergo a torsional strain, such as golf shafts, the replaced prepreg sheet may be used as the angle layer as described in the former embodiment while, for the products which are likely to undergo a bending strain, such as fishing rods and robot arms, the replaced prepreg sheet may be used as the straight layer as described in the latter embodiment.

When the replaced prepreg sheet is used as the angle layer or the straight layer in a cylindrical molding, the pitch-based carbon fibers in the sheet are oriented at an angle of preferably −5° to 5°, still preferably −2° to 2°, still further preferably in a direction substantially identical, to the direction of the PAN-based carbon fibers in the same sheet.

Although the prepreg sheet used as the angle layer in this invention may be a woven prepreg or a unidirectional prepreg, the unidirectional prepreg is preferred because the angle of orientation of the fibers can be easily regulated.

The prepreg sheet used as the straight layer in this invention is preferably a unidirectional prepreg because the orientation of the fibers can be easily regulated.

Thermosetting resins such as epoxy, unsaturated polyester, phenolic, silicone, polyurethane, urea and melamine are used as a matrix resin in the angle layer and the straight layer. Among them, the epoxy resin is preferred.

The weight of the reinforcing fibers per unit area of the angle layer and the straight layer is usually 50 to 180 g/m$^2$, preferably 75 to 150 g/m$^2$. If the straight layer contains the fibers in an amount of more than 180 g/m$^2$, it will be liable to restrict the freedom in the cut shape and weight design of the desired molding, while an angle layer containing more than 180 g/m$^2$ of the fibers will not only restrict the freedom in weight design of the molding but also tend to cause further problems such as deteriorated windability of the prepreg sheet around a mandrel in the course of the preparation of the molding.

For the angle layer, a pair of a positive angle layer and a negative angle layer may be made to overlap with each other and then laminated or wound around a mandrel or the like, or alternatively, the positive angle layer may be laminated or wound around the mandrel or the like followed by the laminating or winding of the negative angle layer thereon.

The number of turns or laminations of the angle layers is usually 1 to 10, preferably 4 to 8. In the case of the tapered cylindrical molding, the total thickness of the angle layers laminated in a larger-diameter portion of the molding may be different from that in a smaller-diameter portion thereof.

The number of laminations of angle layers referred to herein is the total number of the positive and negative angle layers. The number of turns of angle layers would correspond to that in a case where the positive and negative angle layers were connected to one another to form one continuous layer which was then wound around the mandrel. In the case of the tapered cylindrical molding, when the prepreg sheet to be used is cut so that the number of turns thereof on the smaller-diameter side of the molding is different from that on the larger-diameter side thereof, the number of turns of the sheet will continuously vary in from section to section perpendicular to the axis of the shaft (axial direction).

When the pitch-based carbon fibers having a tensile modulus of 400 to 1000 GPa, preferably 600 to 1000 GPa, are used in all or some of the angle layers, the positive angle layer and the negative angle layer may be used as one pair in such a manner that the fibers of the layers are oriented symmetrically with respect to the longitudinal direction or axial direction of the molding to be produced.

The PAN-based carbon fibers used in the straight layer have a compressive strength of usually 500 to 2500 MPa, preferably 700 to 2500 MPa, still preferably 1000 to 2500 MPa.

The straight layer may be cut so that usually 1 to 10 layers are laminated.

According to the present invention, the replaced prepreg sheet which contains a prepreg comprising only pitch-based carbon fibers having a tensile modulus of 400 to 1000 GPa, preferably 600 to 1000 GPa, may be used in all or some of the straight layers.

In the preparation of the molding according to the present invention, a woven prepreg or a unidirectional prepreg may be laminated as a finishing allowance onto the outermost layer or uppermost layer of the molding.

After such a molding is molded, the finishing allowance is trimmed off the molding by usually 0.01 to 1 mm for enhancing the accuracy of the subsequent working of the molding. In this case, the finishing allowance may be entirely or partially trimmed.

The oblong molding such as a sheet or plate or the cylindrical molding according to the present invention usually has a volume fraction of fiber of 50 to 70 vol %.

The logarithmic decrement of the torsional vibration for the carbon fiber-reinforced composite material according to the present invention was measured as follows.

Specifically, as shown in FIG. 2, a cylindrical molding (a shaft) 2 with a strain gage 1 stuck thereto was allowed to perpendicularly stand on a disc 3 with weights so that the smaller-diameter side of the molding faced downward. With the larger-diameter side of the molding fixed to a vice 4, the molding was vibrated to measure the oscillatory waveform created by torsional strain, and the logarithmic decrement was calculated based on the measurements.

The torsional strain was measured by a four-active gage method using two strain gages for biaxial 0°/90° torque so that a pure torsional strain was created. The strain gages were stuck to two positions of the cylindrical molding, one of which is 92 mm distant from the tip of the molding and the other is 920 mm distant from the tip (only one of them being shown).

Regarding the data on the strain, the strain was detected with the strain gages, and the value so detected was input through a bridge box, a dynamic strain gage, and an AD converter into a personal computer. For the input of the data on the strain into the personal computer, the sampling time was $10^{-4}$ to $10^{-3}$ sec, and the number of sampling points was 1000 to 8192.

The tip of the cylindrical molding 2 was fixed to the weights-having disc 3 with the mass being equally distributed in the peripheral direction, so that the center of the disc conformed to the axis of the molding. The moment of inertia around the axis of the shaft can be varied by varying the size, material, and number of the weights 5 on the disc 3. Two threads 6 were mounted on two intersections of the diameter and circumference of the disc 3 with weights, and were simultaneously pulled so that no bending moment occurs, whereby a torsional moment was applied to the molding. Thereafter, the moment was released at a time to allow the molding to free damping vibrate. The torsional vibration was measured for several seconds immediately after the release of the force.

In this invention, the natural logarithm of the ratio of amplitude $A_n$ to amplitude $A_{n+1}$ for each cycle of the oscillation waveform was regarded as the logarithmic decrement as follows:

$$\text{logarithmic decrement} = \log_e(A_n/A_{n+1}). \quad \text{Formula 1}$$

In the actual calculation, when the difference between adjacent amplitudes is small, the logarithmic decrement was determined from the ratio of spaced amplitudes in order to improve the accuracy. In this case, the logarithmic decrement was determined as follows:

$$\text{logarithmic decrement} = \{\log_e(A_n/A_m)\}/(m-n) \quad \text{Formula 2}$$

wherein $A_n$ represents the n-th amplitude and $A_m$ represents the m-th amplitude, provided that n<m.

Meanwhile, the logarithmic decrement of the bending vibration for the fiber-reinforced composite material according to this invention was measured as follows.

A 1.5 mm-thick cantilever was allowed to perpendicularly stand, and the lower side of the cantilever was fixed. The beam was vibrated in air (an electromagnetic transducer being used for excitation), and measured for the displacement in the horizontal direction of the central portion of the beam with a non-contact sensor.

The displacement signals were input into a personal computer through an AD converter. For the input of the data into the personal computer, the sampling time was $10^{-3}$ to $10^{-2}$ sec, and the number of sampling points was 4096. The logarithmic decrement was calculated in the same manner as described above in connection with the cylindrical molding of the carbon fiber-reinforced composite material.

The tensile modulus of the reinforcing fibers was measured according to the procedure set forth in JIS R 7601. The compressive strength of the reinforcing fibers was determined according to the procedure set forth in JIS K 7670 in terms of the volume fraction of fiber while neglecting the compression strength of the resin.

EXAMPLES

Some Examples will be shown below, but this invention is, needless to say, not limited to these Examples.

Example 1

Shaft

A shaft was prepared from an angle layer and a straight layer as follows.

FIG. 1 (1) is a schematic diagram showing the cut form of each of prepregs for the positive angle layer and the mode of connecting the prepregs together. In the drawing, numeral 1*a* designates a prepreg (tradename: E8026C-12S, manufactured by Nippon Graphite Fiber Co., volume fraction of fiber: 60 vol %, weight of fiber per unit area: 125 g/m$^2$) comprising pitch-based carbon fibers (tradename: XN-80, tensile modulus: 785 GPa). This prepreg will constitute the front end portion of the shaft to be prepared. Numeral 2*a* designates a prepreg (tradename: Q-R118, manufactured by Toho Rayon Co., Ltd., volume fraction of fiber: 60 vol %, weight of fiber per unit area: 116 g/m$^2$) comprising PAN-based carbon fibers (tradename: UM46, tensile modulus: 435 GPa). This prepreg will constitute a portion ranging from the middle to the site at hand of the shaft.

More specifically, for the angle layer, the XN-80 prepreg is used in the front end portion ranging from the tip of the shaft to 474 mm on average distant from the tip, and the UM46 prepreg is used in the portion behind that. These two prepregs were connected together to form one positive angle layer.

This positive angle layer was connected to a negative angle layer having a mirror image relationship with the positive layer for lamination. The angles of orientation of the carbon fibers thereof were ±45° to the axial direction of the shaft, and the number of laminations was 8 (4 for each angle layer).

Regarding the straight layer, a prepreg (tradename: P3052S-12, manufactured by Toray Industries, Inc., volume fraction of fiber: 60 vol %, weight of fiber per unit area: 125 g/m$^2$) comprising PAN-based carbon fibers (tradename: T700S, tensile modulus: 230 GPa) was used over the entire length of the shaft, with the number of lamintations of four and the straight layer being wound around the angle layers.

A woven fabric (a plain weave) prepreg was wound around the straight layer, and a shrink tape was further wound around that, followed by heating at 100 to 130° C. to conduct curing. Thereafter, if necessary, the surface of the shrink tape was polished to remove the surface irregularities.

The finished shaft had an overall length of 1120 mm, an inner diameter of 6 mm and an outer diameter of 8.5 mm at the smaller-diameter end, and an inner diameter of 12.5 mm and an outer diameter of 14 mm at the larger-diameter end.

As shown in Table 1, the shaft prepared in Example 1 had an excellent vibration damping property.

Example 2

Shaft

FIG. 1 (2) is a schematic diagram showing the cut form of each of prepregs for an angle layer and the mode of connecting the prepregs together. In the drawing, numeral 1*b* designates a prepreg E8026C-12S comprising pitch-based carbon fibers XN-80 which constitutes the middle portion of a shaft to be prepared, numeral 2*b* a prepreg Q-R118 comprising PAN-based carbon fibers UM46 which constitutes the front end portion, and numeral 2*c* designates a prepreg Q-R118 comprising PAN-based carbon fibers UM46 which constitutes the portion at hand.

More specifically, regarding the angle layer, the XN-80 prepreg is used in the middle portion ranging from a site 474 mm on average to a site 826 mm on average each distant from the front end of the shaft, and the UM46 prepregs are used respectively before and behind the middle portion. These three prepregs were connected to one another to form one positive angle layer. A shaft was prepared in the same manner as in Example 1 with respect to the other conditions. As a result, as shown in Table 1, the shaft of Example 2 had the best vibration damping property next to the shaft of Example 1.

Example 3

Shaft

FIG. 1 (3) is a schematic diagram showing the cut form of each of prepregs for an angle layer and the mode of connecting the prepregs together. In the drawing, numeral 1c designates a prepreg E8026C-12S comprising pitch-based carbon fibers XN-80 which constitutes the portion at hand of the shaft to be prepared, and numeral 2d a prepreg Q-R118 comprising PAN-based carbon fibers UM46 which constitutes a portion ranging from the front end to the middle site of the shaft.

More specifically, regarding the angle layer, the XN-80 prepreg is used in the portion at hand ranging from a site 826 mm on average to a site 1120 mm on average (larger-diameter end) each distant from the front end of the shaft, and the UM46 prepreg is used in the front end portion before that portion. These two prepregs were connected to each other to form one positive angle layer. A shaft was prepared in the same manner as in Example 1 with respect to the other conditions. As a result, as shown in Table 1, the shaft of Example 3 had a vibration damping property next to the shaft of Example 2.

Comparative Example 1

Shaft

A shaft was prepared in the same manner as in Example 1, except that the UM46 prepregs Q-R118 were used in the whole angle layers. As a result, as given in Table 1, the shaft thus prepared was low in vibration damping property.

Example 4

Platy Molding

A carbon fiber composite material plate (platy molding) was prepared from 14 unidirectional prepreg sheets. In this case, regarding two sheets for each of the front and back sides of the plate, the prepreg E8026C-12S comprising pitch-based carbon fibers XN-80 was used in a portion of each of the sheets which occupies one-third of the plate length including the fixing end at which stress would be maximum at the time of bending deformation of a cantilever, while the prepregs Q-R118 comprising PAN-based carbon fibers UM46 were used in the other portions.

As is apparent from Table 2, this molding was high in vibration damping capacity.

Comparative Example 2

Platy Molding

A platy molding was prepared in the same manner as in Example 2, except that the UM46 prepregs Q-R118 were used for all the sheets. As is apparent from Table 2, the platy molding was low in vibration damping capacity.

TABLE 1

| Ex. | Arrangement of Angle Layer | | | Length of XN-80 | Area of XN-80 | Area of XN-80 prepreg sharing Replaced prepreg | Number of Lamination of Straight layer | Made of arranging Layers | Shaft weight | Forward flexibility | Torque | Logarithmic decrement (when shear strain is |
| --- | --- | --- | --- | --- | --- | --- | --- | --- | --- | --- | --- | --- |
| Comp. Ex. | front end | middle | at hand | prepreg mm | prepreg m$^2$ | sheet % | layer Number | (from outside) | g | mm | deg | 1000 $\mu\epsilon$) |
| Ex. 1 | XN-80 | UM46 | UM46 | 474 | 0.0467 | 33 | 4 | Straight/Angle | 80 | 114 | 2.5 | 0.052 |
| Ex. 2 | UM46 | XN-80 | UM46 | 352 | 0.0466 | 33 | 4 | Straight/Angle | 79 | 140 | 2.8 | 0.0097 |
| Ex. 3 | UM46 | UM46 | XN-80 | 294 | 0.0467 | 33 | 4 | Straight/Angle | 80 | 141 | 3.0 | 0.a068 |
| Comp. Ex. 1 | UM46 | UM46 | UM46 | 0 | 0 | 0 | 4 | Straight/Angle | 77 | 143 | 3.1 | 0.0045 |

TABLE 2

|  | Lamination Ratio XN-80/UM46/XN-80 | Area of XN-80 prepreg sharing Replaced prepreg sheet (%) | Bending modulus | Logaritmic decrement (bending strain = 100 $\mu\epsilon$) |
| --- | --- | --- | --- | --- |
| Ex. 4 | a third part/10/2(a third part) | 33 | 310 | 0.028 |
| Comp. Ex. 2 | 0/14/0(MU46 only) | 0 | 220 | 0.009 |

Effects of the Invention

The fiber-reinforced composite material (molding) according to this invention has excellent vibration damping properties. For example, when a shear strain of 1000 $\mu\epsilon$ is applied to the shaft of this invention having a volume fraction of fiber of 50 to 70 vol %, the shaft exhibits a logarithmic decrement of usually 0.005 to 0.1, preferably 0.02 to 0.1, which is larger than that exhibited by a molding having the same resin composition and the same shape and comprising only PAN-based carbon fiber prepreg.

BRIEF DESCRIPTION OF THE DRAWINGS

FIG. 1

A schematic diagram showing the cut shape of each of prepregs constituting a replaced prepreg sheet (an angle layer) and the mode of connection of the prepregs with each other.

FIG. 2

An apparatus for evaluating the vibration damping factor of a cylindrical molding.

Explanation of Signs

1a: pitch-based carbon fiber prepreg for the front end portion of the shaft;

1b: pitch-based carbon fiber prepreg for the middle portion of the shaft;

1c: pitch-based carbon fiber prepreg for the portion at hand of the shaft;

2a: PAN-based carbon fiber prepreg for the portion from the middle to at hand of the shaft;

2b: PAN-based carbon fiber prepreg for the front end portion of the shaft;

2c: PAN-based carbon fiber prepreg for the portion at hand of the shaft;

2d: PAN-based carbon fiber prepreg for the portion from the front end to middle of the shaft;

1: shear strain gage, 2: cylindrical molding (shaft), 3: alminum disc with weights, 4: vice, 5: inertial moment-controlling weight, 6: miniature wire or string, 7: pulley, 8: conductor wire and 9: detector.

What is claimed is:

1. A carbon fiber-reinforced composite material which comprises a laminate of a plurality of prepreg sheets each comprising polyacrylonitrile-based carbon fibers having a tensile modulus of 100 to 600 GPa, characterized in that at least one of the prepreg sheets is a replaced prepreg sheet with one-tenth to one-half area of the sheet replaced by a prepreg comprising only pitch-based carbon fibers having a tensile modulus of 400 to 1000 GPa.

* * * * *